Figure 3:
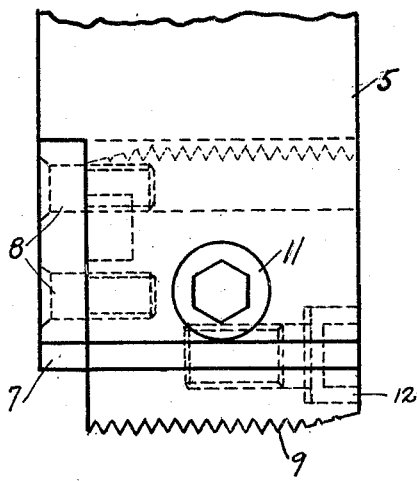

Feb. 12, 1929.

L. S. HALL 1,701,775

CHASER AND CHASER HOLDER

Filed May 19, 1927

WITNESS:
C. P. Harrison

INVENTOR.
Leslie S. Hall.
BY
R. W. Dohm,
ATTORNEY.

Patented Feb. 12, 1929.

1,701,775

UNITED STATES PATENT OFFICE.

LESLIE S. HALL, OF ERIE, PENNSYLVANIA.

CHASER AND CHASER HOLDER.

Application filed May 19, 1927. Serial No. 192,623.

My said invention relates to a die head and particularly to that type of pipe threading machine in which the chasers are mounted to slide radially to position them for the various sizes of pipe which may come within the capacity of the die head. An object of the invention is to provide means whereby the chaser is held securely by being clamped in two directions and having the solid metal of the chaser holder supporting both sides of said chaser.

Another object of the invention is to provide means whereby the chaser holder is of simple construction, easily machined and has no projecting parts to restrict its receding movement into the die head.

Another object of the invention is to provide means whereby the chaser is made double ended and reversible for the purpose of giving additional life at slight expense.

Figure 1:
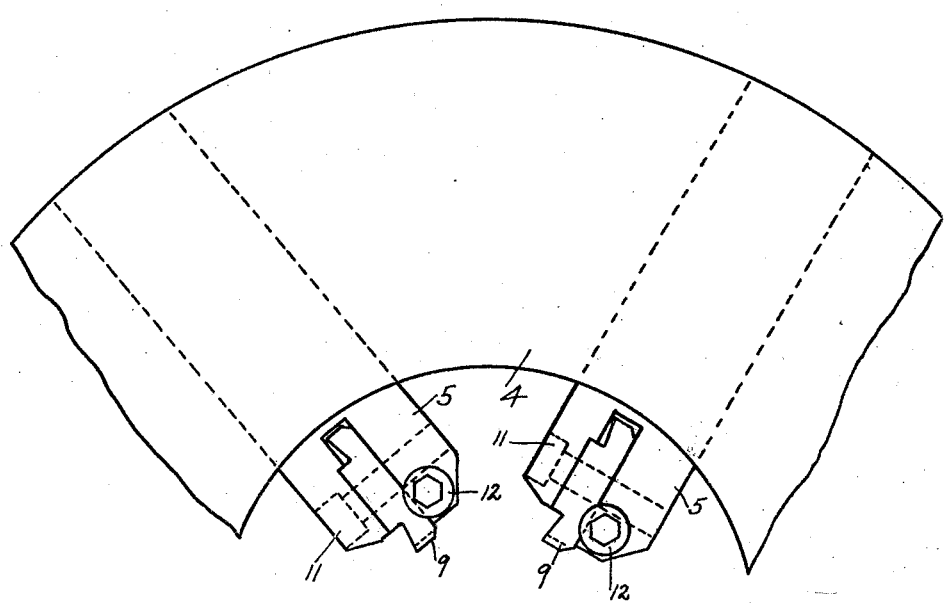

Referring to the drawings which are made a part hereof and on which similar reference characters indicate similar parts:

Fig. 1, is a front elevation showing the chasers and holders in their relation to the die head.

Figure 2:
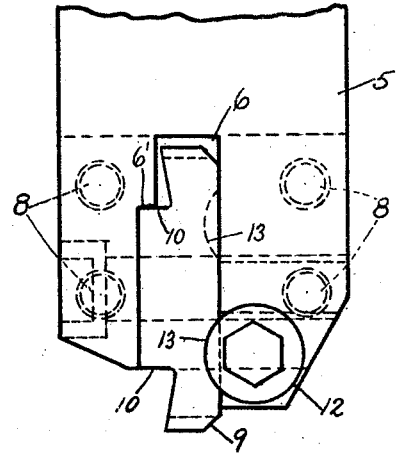

Fig. 2, a front elevation of a chaser on an enlarged scale showing it mounted in the holder, and Fig. 3, a side elevation of the chaser and chaser holder, viewed from the left in Fig. 1.

In the drawings, reference character 4 indicates a portion of a die head having conventionally located and arranged chaser holders 5 thereon, slidably mounted in slots of the head and adjustable for threading pipes of different sizes. Each chaser holder has a slot 6 cut through the same from front to rear at its inner end, with a locating shoulder 6' formed at one side thereof for locating a chaser 9 by engagement of its locating stop 10 with said locating shoulder.

At the rear side of the holder a plate 7 is secured thereto by four pins 8 which are preferably threaded for screwing into threaded holes in the holder. After the pins 8 are driven home they are riveted over at their outer ends so as to make them and the plate 7 practically integral with the holder. The separate plate 7 provides an economical method of forming the slot which can be cut right through the holder (or otherwise formed all the way across the end thereof), and then closed at the rear end. Furthermore the plate 7 can be hardened and ground to form a perfect locating stop for the rear end of the chaser.

The chasers 9 are each provided with thread cutting serrations at each end having locating stops or shoulders 10 adjacent thereto all the way across the chaser and at the same side of the chaser, thus making a very strong and compact design and one in which the action of forming the rake angle for the cutting edges provides such locating shoulders at no additional expense. Midway of the reversible chaser there is a hole for a screw 11 which clamps the chaser in the holder and also prevents the holder from being pried open by heavy strains. The central location is obviously favorable for proper clamping of the chaser to cut at either end.

The chaser also has two similarly located arcuate or chordal depressions 13 providing shoulders for receiving the head of a clamping screw 12 by which the chaser is clamped against plate 7, one such depression being indicated in full lines in Fig. 2, and the other (in dotted lines) being so located at the other side of the chaser as to receive said head when the chaser is reversed.

It will be obvious to those skilled in the art that many changes may be made in my device and in its use, all without departing from the spirit of the invention, therefore I do not limit myself to the specific embodiment shown in the drawings and described in the specification, but only as indicated in the appended claims:

Having thus fully described my said invention what I claim as new and desire to secure by Letters Patent is:

1. In a die head, a holder having a slot at its inner end extending from front to back, a plate secured in an undercut recess at the back of the holder said plate closing said slot at the rear, a chaser in said slot and means engaging the edge of the chaser to force it back against said plate.

2. In a die head, a holder having a slot at its inner end extending from front to back, a stop shoulder at one side of the slot limiting the movement of the chaser lengthwise of the holder, a reversible chaser having locating stops adjacent each cutting edge adapted to bear against said stop shoulder, and means to clamp the chaser in place.

3. In a die head, a holder having a slot at its inner end extending from front to back, a stop shoulder at one side of the slot, a reversible chaser having serrations at each end, a locating stop adjacent each end of the chaser for determining the position of the chaser lengthwise of the holder, and a clamping screw passing through a hole midway of the length of the chaser said screw connecting the forks of the holder divided by said slot.

4. A reversible chaser comprising cutting portions at each end of the chaser, said cutting portions being formed by an inset in the ends of the chaser forming oppositely arranged rake angles for the sharpening edges, the extreme ends of the chaser having cutting serrations, and the surface of each inset in advance of the sharpening edge forming a shoulder for positioning the chaser in the holder.

In testimony whereof I affix my signature.

LESLIE S. HALL.